Oct. 12, 1948. S. B. GRIMSON 2,451,164
PHOTOGRAPHY IN ADDITIVE COLOR BY THE CONTROLLED
UTILIZATION OF CHROMATIC ABERRATIONS IN LENSES
Original Filed March 3, 1944
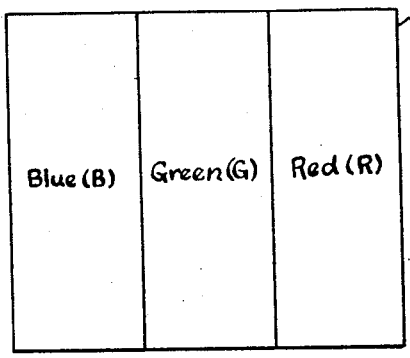
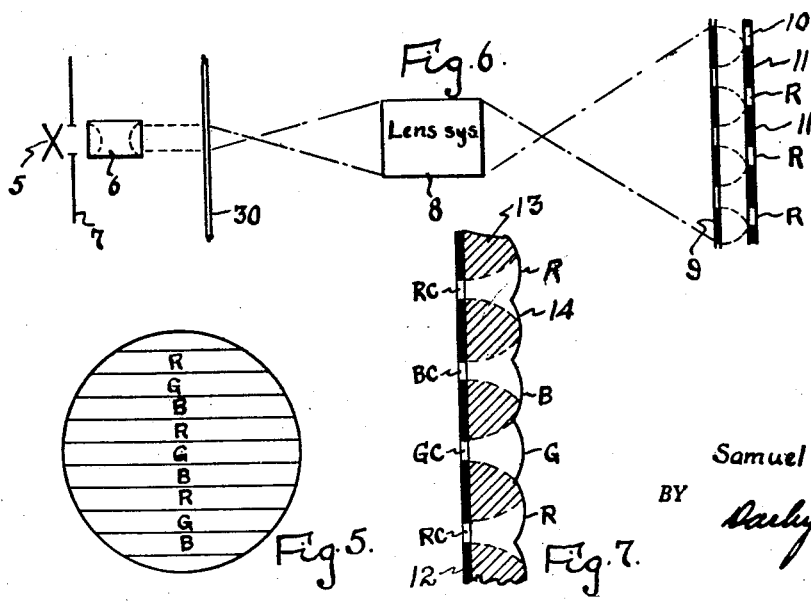
INVENTOR.
Samuel B. Grimson
BY
Dailey & Dailey
Attys.

Patented Oct. 12, 1948

2,451,164

UNITED STATES PATENT OFFICE 2,451,164

PHOTOGRAPHY IN ADDITIVE COLOR BY THE CONTROLLED UTILIZATION OF CHROMATIC ABERRATIONS IN LENSES

Samuel B. Grimson, New York, N. Y., assignor to Color Research Corporation, New York, N. Y., a corporation of Delaware Original application March 3, 1944, Serial No. 524,860. Divided and this application January 24, 1946, Serial No. 643,063

5 Claims. (Cl. 88—24)

1

This invention relates to the use of filled diffraction gratings and filled gratings in the form of black and white photographic images representative of a scene in color, and the inherent characteristic in projection lenses known as chromatic aberrations.

The objects of this invention will be best appreciated in connection with the following detailed description of the nature, scope and uses thereof, and will not, therefore, be set out in advance of such disclosures.

This invention resides substantially in the steps and series of steps as hereinafter disclosed and defined in the appended claims.

This application is a division of my copending application Serial No. 524,860, filed March 3, 1944, and similarly titled, now Patent No. 2,418,-345, issued January 4, 1947.

In the accompanying drawings,

Figure 1 illustrates a three-color target representative of a simple color scene upon the basis of which the disclosure herein will be made;

Figure 2 shows diagrammatically a black and white three-color separation negative of the original scene of Figure 1, greatly enlarged, as employed in the process herein;

Figure 3 is a similar illustration of a positive printed from the negative of Figure 2;

Figure 4 is a diagrammatic illustration of the apparatus employed in making the negative of Figure 2;

Figure 5 is a plan view of a preferred form of multi-color filter used in producing the negative of Figure 2;

Figure 6 is a diagrammatic side elevational view illustrating the method of employing the positive of Figure 3 (or the negative of Figure 2) to reproduce the original scene in color in accordance with this invention; and Figure 7 illustrates how the same ultimate effect is secured by the substitution of a lenticular film for the diffraction grating 9 and screen 10 of Figure 6.

In order that one may have a complete understanding of the subject matter of the invention hereindisclosed, a portion of the disclosure in my Patent No. 2,164,062, granted June 27, 1939, for Diffraction method of and apparatus for color photography will be reproduced here. There is disclosed in that patent a method of producing a three-color separation negative on a black and white film by means of an ordinary motion picture camera employed in conjunction with a three-color filter in which the colors are duplicated one or more times, and a diffraction grating

2 which may be incorporated in the camera and which needs no special manipulation. Such an arrangement is shown in Figure 4, in which is employed a three-color filter of a type illustrated in Figure 5. The filter of Figure 5 differs from the usual three-color filter in that the color bands thereof are duplicated a number of times, three in the instance illustrated, with the central band disposed equi-distantly on opposite sides of the diameter of the filter. Thus the filter 1 comprises a series of regularly repeating color bands of red, green and blue. As illustrated in Figure 4, the color filter 1 is placed in front of the usual lens system 2 of a camera so that the light from the scene to be photographed will pass first through the filter and then through the lens system. At this point it is to be noted that the filter 1 preferably is, as illustrated, divided into equal width bands of solid color. The extreme unmarked upper and lower portions of the filter (Figure 5) are masked off in any suitable manner so as to restrict its light transmitting area to the banded color portions.

The picture to be photographed through the filter 1 is focused on a sensitized negative film 4 through a diffraction grating 3, and these parts are relatively positioned so that images of the color filter, formed by the slits of the grating, are brought to a focus on the film 4. As illustrated in the above mentioned patent, the images of the color filter may be brought to a first focus as the plane of the film, or the grating may be moved away from the film, so that the filter images will be at an overlapping focus at the film plane, in which case they are respectively two or three times as wide as at the so-called first focus. In the latter cases each series of three-color bands is compounded of light from the two or three series of color bands forming the filter, and each slit of the grating will project only a single tri-color image. The advantages of this arrangement for this purpose are clearly disclosed in the above mentioned patent.

The filter is placed so that its color bands extend transversely of the film as do the lines of the diffraction grating, that is horizontally as indicated in Figure 1. In the case illustrated the diffraction grating is ruled on the rear face of a piece of optically flat glass 3, in accordance with well known practice, so that each clear line is preferably about one-half as wide as the ruled or opaque lines, that is the filled in lines. In one practical form there are preferably about 600 ruled lines to the inch, leaving, of course, 600 clear lines therebetween.

When the black and white negative 4 is exposed through a lens system 2, as illustrated in Figure 4, the film upon development will be found to carry an image of the object photographed, as, for example, the target 19 of Figure 1. If this image is scrutinized under a microscope, it will be found to be made up in the ratio of 1800 lines to the inch, in the case of a 600 line grating, of linear densities corresponding to the exposures made through the three-color bands of the filter employed. As those skilled in the art are aware, it is advantageous to use a film coated with an emulsion as nearly as possible equally sensitive to the three filter colors, although whichever colors are found to be overexposed may be corrected by partially masking the corresponding filter areas, and thus producing a correctly balanced negative. Such a negative film 20, after development, is illustrated in greatly enlarged proportions in Figure 2, and as illustrated, as the result of photographing the three-color target of Figure 1 with the apparatus of Figure 4, the areas B will contain images corresponding to the blue portion of the target, the areas G will contain images corresponding to the green portion of the target, and the areas R will contain images corresponding to the red portions of the target. The remaining unmarked portions of the negative 20 represent unexposed areas as the result of no exposure thereof through the tri-color filter, as will be well understood by those skilled in the art. Thus the resulting negative produced by photographing the target of Figure 1 with the apparatus of Figure 4 comprises a multiplicity of linear densities corresponding to the color sensations recorded through the color banded filter as described.

A print is made from the negative 20 of Figure 2 to produce the positive film 30 of Figure 3. As those skilled in the art will readily appreciate, the negative of Figure 2 can be developed by reversal to a positive if desired. The positive 30 no matter how produced now contains clear areas BC corresponding to the blue areas B, GC corresponding to the green areas G, and RC corresponding to the red areas R of the negative 20. The remaining areas of the positive film 30 will contain densities D, since these portions thereof will be exposed upon printing through the clear unmarked areas of the negative 20. Thus the positive when procured will have the characteristics of a filled diffraction grating all the parts of which have the same frequency as that of the diffraction grating 3 through which it was taken, but the bars are shifted vertically from color-area to color-area according to the colors of the subject photographed. It is a composite grating in which the frequencies are not changed but the vertical location of the clear interspaces BC, GC and RC, i. e. the slits covering the specific areas, is changed.

Having thus secured the positive film 30 of Figure 3 it is possible, in accordance with this invention, to produce an image of the original scene it represents in the colors of the original scene by projecting it by means of a lens system through a filled grating of similar frequency upon a screen adjacent the grating and situated in the focal plane. The apparatus for accomplishing this fact is diagrammatically illustrated in Figure 6, wherein a light source is diagrammatically illustrated at 5, the light from which is directed by means of the condensing lens 6 upon the positive film 30. A mask 7 is preferably interposed between the light source and the condensing lens for the usual purpose. The illuminated area of the positive film 30 is projected by the lens system 8 upon the filled diffraction grating 9 which, of course, is of the same frequency as the projected image. The image of the positive 30 is sharply focused on a viewing plane 10 which may, for example, be a piece of ground glass.

It is believed, although the following theory is not presented as necessarily correct, that spectra are formed by the projected slits of the positive 30. While the projected image shows no color at all from the front of the screen 10, the projected image being simply in black and white, when it is viewed from the rear of the screen 10, it appears in the colors of the original scene provided the bars of the grating are properly positioned in a vertical direction (Figure 6) relative to those of the projected image.

The colored picture is believed to be an aerial image formed to the rear of the focal plane by reconstituted chromatic aberrations in the projection lens 8, these aberrations having been corrected in the lens for projection upon the focal plane but become manifest once more after that plane has been passed by the light rays.

The reason for this belief resides in the fact that unless either the positive film is projected upon the grating or a grating is projected upon the positive film, as will be described later, there is no color to be seen. If, for example, a grating is placed in close proximity to the positive film, both together being illuminated by white light, the image remains black and white and no color is visible. The decisive factor seems to be the projection lens 8, which should be sufficiently well color corrected so that the three primary colors can be focused on the same plane, as it is in this element that the observed color must have its origin. Photographic lenses are achromatized by bringing at least two spectral lines to a common focus. The projection lenses to which reference is had throughout this disclosure are preferably well correlated for at least two colors.

However, regardless of the optical phenomena involved, it will be seen that when an image of the positive 30 is projected upon the screen 10 through the diffraction grating 9, the original scene represented by the positive 30 will appear on the right hand face of the screen in color. In Figure 6 this has been illustrated for the red portion of the target 19 when the parts are properly adjusted, it being indicated that the areas R, the red areas, are separated by dark spaces 11. However, the entire hand face of the screen 10 will appear to be illuminated with red light. Particular regions of the spectra formed by the clear slits projected onto the diffraction grating will be occluded by the bars thereof, and approximately one-third of each spectrum will be revealed to view as indicated by the areas R, while the remainder of each spectrum will be occluded to form the shaded areas 11. The particular portions of the spectra revealed are predetermined by the vertical adjustment of the clear spaces of the positive 30 with respect to the slits of the diffraction grating 9.

At this point it may be noted that the original scene can be reproduced in true color or in other colors not only by the relative shifting of the positive 30 and the diffraction grating 9, but by vertical shifting in either direction of the lens system 8.

Pursuing these adjustments further, it is to be noted that color changes can be effected by leaving the lens system 8 and the diffraction grating 9 fixed and shifting the positive 30 vertically. Likewise, with the lens system fixed and the positive 30 fixed, the same result can be secured by shifting the diffraction grating 9 vertically. Finally, as mentioned above, by leaving the positive 30 fixed and the diffraction grating 9 fixed, the same effect can be secured by shifting the lens system 8 vertically.

There is likewise another change which can be made to produce the results of this invention, which consists in a reversal of the parts in that the diffraction grating 9 is placed at the position of the positive film 30, as it is illustrated in Figure 6, and the positive film 30 is placed at the illustrated position of the diffraction grating 9. In other words, by projecting an image of the diffraction grating 9 on the positive film 30 the scene may be made to appear in colors on the right hand face of screen 10. Here again these colors may be changed by the relative shifting of the positive film, the diffraction grating and/or the lens system.

The same results can be secured by substituting a lenticulated film for the diffraction grating 9 and the screen 10. If we imagine that the diffraction grating 9 and the screen 10 are removed and the lenticulated film of Figure 7 substituted therefor, the scene can be reproduced in color in the following manner. The image of the positive film 30 is projected sharply upon the emulsion 12 of the lenticulated film 13. The size of the image is adjusted so that one series of color bands exactly equals the height of one of the lenticules 14. Again, the light rays after passing the focal plane, that is the emulsion, form spectra which are projected onto lenticules 14 of the film, as illustrated in Figure 7. An observer, facing the lenticules and viewing them through a slit, will see only those regions of the spectra which lie along the axes of the lenticules, the light from the other regions being refracted away from the observer. It will be noted in Figure 7 there has been illustrated the effect of the projection of a full set of clear spaces or slits of the positive film 30 so that when viewing the film of Figure 7 all three colors will appear, as illustrated in Figure 7, the projected images of the slits of the positive 30 being indicated at BC, GC and RC in Figure 7. Since the areas BC, GC and RC of the positive 30 are vertically staggered, they will transmit light to different portions of the lenticules, as indicated in Figure 7, so that portions of the spectra falling upon the center parts of the lenticules will be different, but in the original order and colors of the original scene if the vertical position of the positive film 30 for a particular position of the lens 28 is correctly adjusted with respect to the lenticules.

As previously described, the original scene can be reproduced in other colors by shifting either the positive, the lens system, or the lenticulated film.

Those skilled in the art will readily appreciate that the negative of Figure 2 can be used in place of the positive 30 in the system of Figure 6 to reproduce the original scene in complementary colors. Reproduction in this case can again be secured either by the diffraction grating 9 or the lenticulated film 13. The parts may be relatively shifted with respect to the position which produces complementary colors to positions to reproduce the original scene in other colors, as will be apparent to those skilled in the art in view of this disclosure.

One of the many uses of this discovery is that of printing directly onto the emulsion of a lenticulated film from the black and white color negative of Figure 2 produced as previously described. The image of the negative is focused on the emulsion of a lenticulated film and viewed through a slit from the lenticulated side. The piece of lenticulated film used for this purpose will be mounted in a holder which can be adjusted vertically, horizontally and rotationally, and when adjusted so that the resulting colors are correct from top to bottom and the moire caused by incorrect azimuth setting is caused to disappear, the image on the emulsion will be perfectly sharp and the linear densities of which it is composed will be exactly registered with the lenticules. The test piece of lenticulated film will, of course, be arranged physically or optically with relation to the lenticulated film upon which the print is to be made so that when adjustment is thus made on the test piece it will be known to be correct for the sensitized negative.

There are many other uses for the subject matter of this invention, as those skilled in the art will readily appreciate, and therefore, only one practical example of its use is detailed herein.

It is to be understood that the attempt herein to explain the optical phenomena which operate to produce the results herein disclosed is a more or less academic effort, in view of the fact that the reasons for the results produced are obscure. It is to be understood, therefore, that such explanation of the supposed phenomena is not to be taken as necessarily correct. There has been clearly disclosed herein the method of producing the results described, which results may be reproduced by others by following this disclosure, which it is believed is adequate for a proper disclosure of invention under the patent statutes. I do not understand, therefore, that the validity of any patent granted on the basis of this disclosure is to be affected one way or the other by the accuracy of the description of the phenomena involved.

From the above description of this invention those acquainted with this art will readily appreciate the variations of which it is capable, and I do not, therefore, desire to be strictly limited to this disclosure, but rather by the scope of the claims granted me.

What is claimed is:

1. A method of producing an original scene in colors from a plain base film having a black and white photographic image of that scene in the form of a repeating series of lined color values, which comprises uniformly illuminating such an image with white light, projecting that image by means of a lens through a filled diffraction grating, adjusting the relative axial positions of said film, lens and diffraction grating until said image is focused through said diffraction grating, and relatively displacing said lens and grating axially with respect to each other and said film while maintaining said focus until the periodicity of the film image lines is the same as that of the grating, whereupon the original scene appears in original color.

2. In the method of claim 1, the additional step of placing a translucent screen in the focal plane so that the entire image in original color appears thereon.

3. A method of reproducing an original scene in colors from a plain base film having a black and white photographic image of that scene in the form of a repeating series of lined color values, which comprises uniformly illuminating a filled diffraction grating with white light, projecting an image of said grating by means of a lens through said plain base film and placing said lens and plain base film with respect to each other and to said grating until the grating image is focused through the film and continuing said relative spacing movements while maintaining said focus until the periodicities of said grating and the film image lines are the same, whereupon said black and white image appears in original colors when viewed from the rear of said plain base film.

4. In the method of claim 3 the additional step of placing a translucent screen in contact with said plain base film so that the original scene will appear thereon in full colors.

5. A method of reproducing an original scene in colors from a plain base film having a black and white photographic image of that scene in the form of a repeating series of lined color values, which comprises spatially aligning such a plain base film and a diffraction grating, illuminating one of said lined elements with white light, interposing a lens between said elements in alignment therewith, relatively positioning said elements and lens with respect to each other so as to bring the image of the illuminated element into focus through the other of said lined elements and relatively displacing said lens and said last element axially with respect to each other and said first element while maintaining said focus until the periodicities of said lined elements are the same, whereupon the original scene appears in original color.

SAMUEL B. GRIMSON.

REFERENCES CITED

The following references are of record in the file of this patent:

UNITED STATES PATENTS

| Number | Name | Date |
|---|---|---|
| 1,833,634 | Brosse | Nov. 24, 1931 |
| 1,903,971 | Baker | Apr. 18, 1933 |
| 2,008,989 | Miller | July 23, 1935 |

---

Certificate of Correction

Patent No. 2,451,164.  October 12, 1948.

SAMUEL B. GRIMSON

It is hereby certified that errors appear in the printed specification of the above numbered patent requiring correction as follows:

Column 4, line 45, for the word "correlated" read *corrected*; line 56, before "hand" insert *right*;

and that the said Letters Patent should be read with these corrections therein that the same may conform to the record of the case in the Patent Office.

Signed and sealed this 28th day of December, A. D. 1948.

[SEAL]

THOMAS F. MURPHY,
*Assistant Commissioner of Patents.*